(No Model.)
F. FEENEY.
AUGER HANDLE.
No. 598,915.  Patented Feb. 15, 1898.
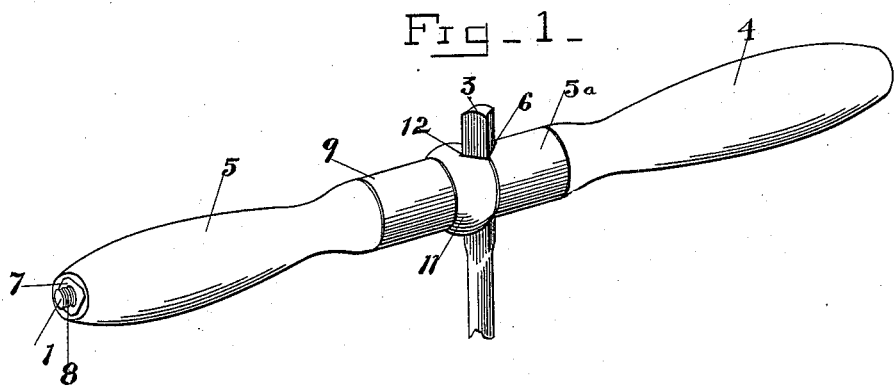
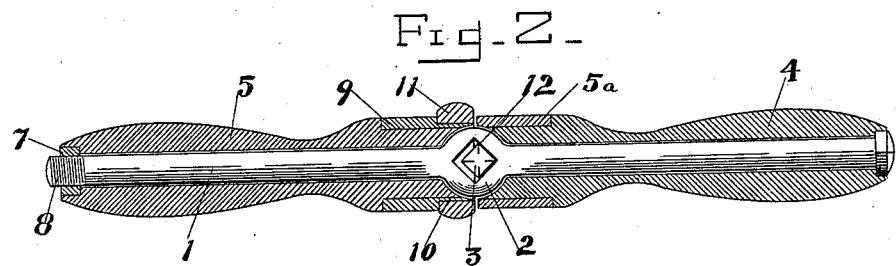
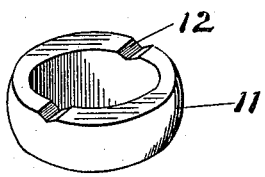
Inventor
Frank Feeney
Witnesses
L. R. Medcalf
J. F. Riley
By his Attorneys,
C. A. Snow & Co.

UNITED STATES PATENT OFFICE.

FRANK FEENEY, OF ARDOCH, NORTH DAKOTA, ASSIGNOR OF ONE-HALF TO P. J. MULLOY, OF SAME PLACE.

AUGER-HANDLE.

SPECIFICATION forming part of Letters Patent No. 598,915, dated February 15, 1898.

Application filed May 29, 1897. Serial No. 638,757. (No model.)

*To all whom it may concern:*

Be it known that I, FRANK FEENEY, a citizen of the United States, residing at Ardoch, in the county of Walsh and State of North Dakota, have invented a new and useful Auger-Handle, of which the following is a specification.

The invention relates to improvements in auger-handles.

The object of the present invention is to improve the construction of auger-handles and to provide a simple, inexpensive, and efficient one capable of ready adjustment to fit the shank of an auger or similar tool and adapted to grip the same firmly with sufficient force to enable a tool to be readily withdrawn from a hole without disengaging the shank from the handle.

The invention consists in the construction and novel combination and arrangement of parts, as hereinafter fully described, illustrated in the accompanying drawings, and pointed out in the claims hereto appended.

In the drawings, Figure 1 is a perspective view of an auger-handle constructed in accordance with this invention. Fig. 2 is a longitudinal sectional view. Fig. 3 is a detail perspective view of the clamping-collar.

Like numerals of reference designate corresponding parts in the several figures of the drawings.

1 designates a rod having a central enlargement with a rectangular shank-receiving opening 2 arranged with two of its angles or corners disposed longitudinally of the rod in order to enable the opposite edges of a shank 3 to be clamped between a fixed handle 4 and an adjustable handle 5. The fixed handle, which is provided with a longitudinal bore to receive the rod, is rigidly secured to the same in any suitable manner and is provided at its inner engaging end with a ferrule 5ª. The ferrule 5ª, which partially receives the central enlargement of the rod, is provided with notches 6, arranged above and below the opening 2 and adapted to receive one edge of the shank 3.

The adjustable handle 5, which has a longitudinal bore or opening similar to the fixed handle, is provided at its outer end with a nut 7, engaging a threaded portion 8 at one end of the rod 1, whereby the handle 5 is adapted to be rotated to advance it toward and withdraw it from the fixed handle, thereby enabling the shank 3 to be firmly gripped. The engaging end of the adjustable handle 5 is provided with a sleeve 9, having a reduced portion 10 at its outer end and receiving a clamping-collar 11, which is provided with notches 12, adapted to engage the shank 3 at a point opposite the fixed handle. The collar 11 remains stationary and in engagement with the shank while the rotary handle is being rotated to produce the necessary clamping action.

The invention has the following advantages: The handle, while being exceedingly simple and inexpensive in construction, possesses great strength and durability, and it is readily adjustable to suit the size of the shank to be clamped. It is also capable of gripping the shank of a tool with sufficient force to enable the same to be readily withdrawn from a hole without disengaging it from the said shank.

What I claim is—

1. A device of the class described comprising a rod having a threaded portion and provided with a central shank-receiving opening, a fixed handle mounted on the rod at one side of the opening and arranged to engage one edge of a shank, an adjustable handle arranged on the rod at the other side of the opening and provided with a nut engaging the threaded portion of the rod, said adjustable handle being provided at its inner end with a reduced portion, and a clamping-collar arranged on the reduced portion of the adjustable handle and adapted to engage the edge of a shank at a point opposite the fixed handle, substantially as described.

2. A device of the class described comprising a rod provided with a central shank-receiving opening, a fixed handle mounted on the rod at one side of the opening and arranged to engage one edge of a shank, an adjustable handle arranged on the rod at the other side of the opening and provided at its inner end with a reduced portion, and a clamping-collar arranged on the reduced portion of the adjustable handle and adapted to engage the edge of a shank at a point opposite the fixed handle, substantially as described.

In testimony that I claim the foregoing as my own I have hereto affixed my signature in the presence of two witnesses.

FRANK FEENEY.

Witnesses:
PATRICK J. MULLOY,
C. W. DENNISTON.